(12) United States Patent
Shin

(10) Patent No.: US 10,924,725 B2
(45) Date of Patent: Feb. 16, 2021

(54) METHOD OF REDUCING ALIGNMENT ERROR BETWEEN USER DEVICE AND LENTICULAR LENSES TO VIEW GLASS-FREE STEREOSCOPIC IMAGE AND USER DEVICE PERFORMING THE SAME

(71) Applicant: MOPIC CO., LTD., Suwon-si (KR)

(72) Inventor: Chang Bong Shin, Suwon-si (KR)

(73) Assignee: MOPIC CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/558,817

(22) Filed: Sep. 3, 2019

(65) Prior Publication Data

US 2019/0394451 A1    Dec. 26, 2019

Related U.S. Application Data

(63) Continuation of application No. PCT/KR2018/003247, filed on Mar. 21, 2018.

(30) Foreign Application Priority Data

Mar. 21, 2017 (KR) .......................... 10-2017-0035122

(51) Int. Cl.
*H04N 13/305*    (2018.01)
*G02B 30/27*    (2020.01)

(52) U.S. Cl.
CPC .......... *H04N 13/305* (2018.05); *G02B 30/27* (2020.01)

(58) Field of Classification Search
CPC .................................................. H04N 13/305
See application file for complete search history.

(56) References Cited

U.S. PATENT DOCUMENTS 8,692,871 B2 * 4/2014 Harrold ................ H04N 13/398
                                                         348/51
9,380,179 B2 * 6/2016 Sugimoto .......... H04N 1/00962
(Continued)

FOREIGN PATENT DOCUMENTS

CN         102540491        7/2012
CN         106461959        2/2017
(Continued)

OTHER PUBLICATIONS

International Search Report—PCT/KR2018/003247 dated Jun. 26, 2018.

*Primary Examiner* — Irfan Habib
(74) *Attorney, Agent, or Firm* — Cantor Colburn LLP

(57) ABSTRACT

A method of reducing an alignment error between a user device and lenticular lenses to view a glass-free stereoscopic image includes: (a) providing an angle adjustable user interface configured to display at least one interference pattern line and a reference line in a display area of the user device where the lenticular lenses attach; (b) receiving a user input to adjust a slant angle of the interference pattern line to the reference line; and (c) displaying the interference pattern line with an changed slant angle in response to the user input and defining a slant angle of the pixel line according to the changed interference pattern line. The pixel line is configured to include multiple lines represented by multiple pixels that constitute the display area of the user device and has a specific slant. The lens line refers to a pattern of multiple lines formed by multiple convex lenses that constitute the lenticular lenses and the interference pattern line is formed by the lens line and the pixel line.

19 Claims, 14 Drawing Sheets

(56) References Cited

U.S. PATENT DOCUMENTS

| | | | |
|---|---|---|---|
| 9,648,307 B2* | 5/2017 | Lee | H04N 13/305 |
| 9,998,733 B2* | 6/2018 | Effendi | H04N 13/368 |
| 10,192,135 B2* | 1/2019 | Krenzer | G06T 7/13 |
| 10,257,503 B2* | 4/2019 | Vdovin | H04N 13/305 |
| 10,448,001 B2* | 10/2019 | Shin | H04N 13/305 |
| 10,455,138 B2* | 10/2019 | Schillebeeckx | H04N 5/23212 |
| 2009/0052027 A1 | 2/2009 | Yamada et al. | |
| 2010/0039698 A1* | 2/2010 | Robinson | H04N 13/324 355/316 |
| 2010/0259697 A1* | 10/2010 | Sakamoto | G02F 1/1313 349/15 |
| 2011/0181706 A1* | 7/2011 | Harrold | G02B 30/26 348/51 |
| 2011/0187948 A1* | 8/2011 | Kashiwagi | G02F 1/1335 349/15 |
| 2013/0242386 A1* | 9/2013 | Koito | H04N 13/31 359/464 |
| 2013/0321246 A1* | 12/2013 | Li | H04N 13/398 345/31 |
| 2014/0015942 A1* | 1/2014 | Said | G02B 30/27 348/59 |
| 2014/0098308 A1* | 4/2014 | Wu | H04N 13/305 349/15 |
| 2014/0111854 A1* | 4/2014 | Kroon | G02B 30/27 359/463 |
| 2014/0152927 A1* | 6/2014 | Watanabe | G02F 1/133512 349/15 |
| 2014/0176676 A1* | 6/2014 | Lin | H04N 13/366 348/46 |
| 2015/0185489 A1* | 7/2015 | Jin | G02B 30/27 359/463 |
| 2015/0189258 A1* | 7/2015 | Jin | H04N 13/305 348/51 |
| 2015/0370079 A1* | 12/2015 | Shin | G02B 30/27 359/463 |
| 2016/0077349 A1* | 3/2016 | An | H04N 13/305 348/55 |
| 2016/0269718 A1* | 9/2016 | Jin | H04N 13/305 |
| 2019/0124313 A1* | 4/2019 | Li | H04N 13/305 |

FOREIGN PATENT DOCUMENTS

| | | |
|---|---|---|
| KR | 20060113031 | 11/2006 |
| KR | 20070111763 | 11/2007 |
| KR | 20100064525 | 6/2010 |
| KR | 20150145160 | 12/2015 |
| KR | 20160024367 | 3/2016 |
| KR | 20160080877 | 7/2016 |
| WO | 2014097456 | 6/2014 |

* cited by examiner

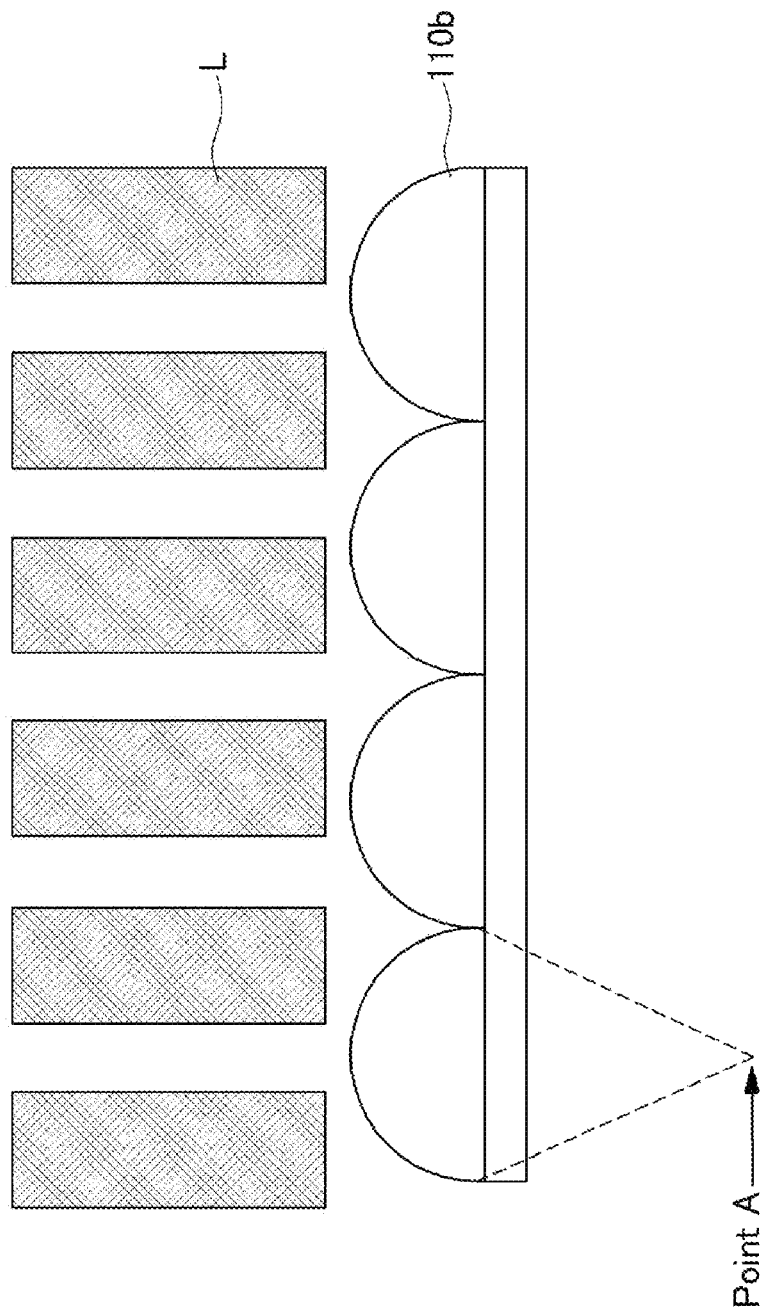

METHOD OF REDUCING ALIGNMENT ERROR BETWEEN USER DEVICE AND LENTICULAR LENSES TO VIEW GLASS-FREE STEREOSCOPIC IMAGE AND USER DEVICE PERFORMING THE SAME

TECHNICAL FIELD

The present disclosure relates to a method of reducing an alignment error between a user device and lenticular lenses to view a glass-free stereoscopic image and a user device performing the method, and more particularly, to a technique for solving misalignment between lenticular lenses and a pixel array in a display area of a user device, which occurs when a cover including the lenticular lenses are attached to the display area.

BACKGROUND

A 3D display (i.e., stereoscopic image display device) refers to the whole system that enables a user to feel a virtual three-dimensional effect by flat display hardware using binocular disparity generated when a human's eyes are away from each other by about 65 mm in a horizontal direction, among various factors allowing the user to feel the three-dimensional effect In other words, although a human's eyes view the same object, they see slightly different images (more correctly, horizontal spatial information is slightly divided) due to the binocular disparity. When the two images are delivered to the brain through the retina, the brain precisely unites the two images to allow the user to feel a three-dimensional effect. Based on this, a 2D display device is designed to simultaneously display two left and right images and deliver them to the respective eyes to create a virtual three-dimensional effect, which is called a stereoscopic image display device.

In order to display images of two channels on a single screen in the stereoscopic image display device, in most cases, a channel is output at a time, while changing the lines in one of horizontal or vertical direction on the single screen. When images of two channels are simultaneously output from the single display device, in case of a glass-free scheme, the right image is delivered to the right eye as it is while the left image is delivered only to the left eye, in terms of the hardware structure.

As a representative glass-free method, there has been known lenticular lenses scheme in which a lenticular lens sheet on which cylindrical lenses are vertically arranged is installed in front of a display panel. Such a glass-free stereoscopic image display device has been mainly developed in the field of large-scale display devices such as TVs.

Meanwhile, when the lenticular lens sheet is installed in front of the display panel in the glass-free stereoscopic image display device, an assembly error inevitably occurs. That is, if a designed angle for assembly is a°, an error of at least 0.05° inevitably occurs. If an error of about 0.05° occurs, it is difficult to view a vivid stereoscopic image. A higher error value may cause a blurred image. Further, even if a lenticular lens sheet is manufactured as precisely as possible in a factory and provided to a consumer, when the consumer him/herself attaches the lenticular lens sheet to a display panel, an error may occur again.

PRIOR ART DOCUMENT

Patent Document (Patent Document 1) Korean Patent Laid-open Publication No. 10-2016-0024367 (entitled "3-dimensional image display device", Publication Date: Mar. 4, 2016)

DISCLOSURE OF THE INVENTION

Problems to be Solved by the Invention

The present disclosure is conceived to solve the above-described problem of the conventional technology and provides an angle adjustable user interface that enables a user to intuitively and easily remove an error whenever an error occurs such as when lenticular lenses are manufactured and attached to a user device in a factory or when the user him/herself attaches the lenticular lenses to the user device and thus enables the user to view a clear stereoscopic image.

Means for Solving the Problems

A method of reducing an alignment error between a user device and lenticular lenses to view a glass-free stereoscopic image according to a first aspect of the present disclosure includes: (a) providing an angle adjustable user interface configured to display at least one interference pattern line and a reference line in a display area of the user device where the lenticular lenses attach; (b) receiving a user input to adjust a slant angle of the interference pattern line to the reference line; and (c) displaying the interference pattern line with an changed slant angle in response to the user input and defining a slant angle of the pixel line according to the changed interference pattern line. The pixel line is configured to include multiple lines represented by multiple pixels that constitute the display area of the user device and has a specific slant. The lens line refers to a pattern of multiple lines formed by multiple convex lenses that constitute the lenticular lenses and the interference pattern line is formed by the lens line and the pixel line.

A user device configured to reduce an alignment error between the user device and lenticular lenses to view a glass-free stereoscopic image according to a second aspect of the present disclosure includes: a memory that stores a program configured to implement a method of reducing an alignment error between a user device and lenticular lenses to view a glass-free stereoscopic image; and a processor configured to execute the program. Upon execution of the program, the processor provides an angle adjustable user interface configured to display at least one interference pattern line and a reference line in a display area of the user device after the lenticular lenses are attached to the display area of the user device, receives a user input to adjust a slant angle of the interference pattern line to the reference line, and displays the interference pattern line with the changed slant angle in response to the user input and defines a slant angle of the pixel line according to the changed slant angle of the interference pattern line. The pixel line is configured to include multiple lines represented by multiple pixels that constitute the display area of the user device and has a specific slant. The lens line refers to a pattern of multiple lines formed by multiple convex lenses that constitute the lenticular lenses and the interference pattern line is formed by the lens line and the pixel line.

Effects of the Invention

The present disclosure can minimize an error occurring when a cover including lenticular lenses are manufactured and attached in a factory and an error occurring when a consumer him/herself attaches the cover to a user device and thus enables the user to smoothly view a vivid stereoscopic image.

Further, the present disclosure intuitively provides a user interface that can magnify a misalignment state caused by the above-described errors and adjust the misalignment and thus enables the user to easily remove an error.

BRIEF DESCRIPTION OF THE DRAWINGS

FIG. 7A and FIG. 7B are conceptual diagrams provided to explain a lens line of lenticular lenses;

MODE FOR CARRYING OUT THE INVENTION

Figure 1:
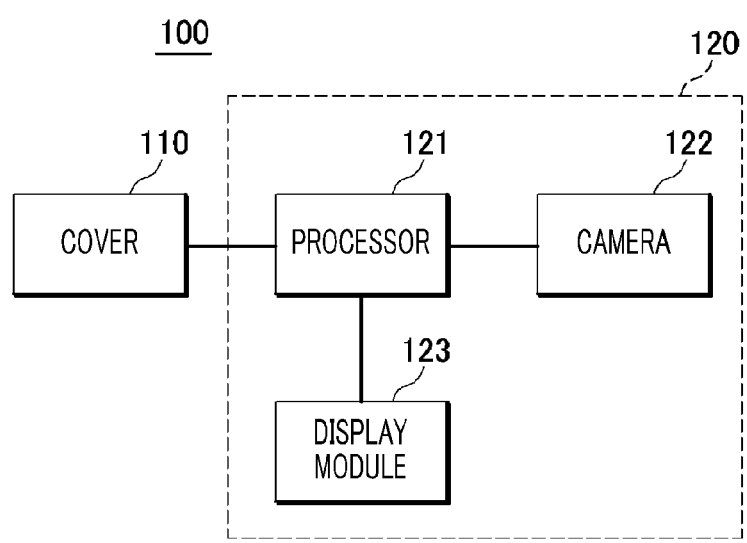
FIG. 1 is a configuration view of a glass-free stereoscopic image display device in accordance with an embodiment of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

A "user device" to be described below may be implemented with computers or portable devices which can access a server or another device through a network. Herein, the computers may include, for example, a notebook, a desktop, and a laptop equipped with a WEB browser. For example, the portable devices are wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

Referring to FIG. 1, a glass-free stereoscopic image display device 100 in accordance with an embodiment of the present disclosure includes a cover 110, a processor 121, a camera 122, and a display module 123.

The cover 110 is configured to cover a display area of a user device 120 in order to protect the outside of the user device 120. The cover 110 may be manufactured separately from the user device 120 and then combined with the user device 120.

The user device 120 may include the processor 121, a memory (not illustrated), and the display module 123. Herein, the memory stores therein a program (or application) for performing a glass-free stereoscopic image display method, and when the program is executed by the processor 121, a stereoscopic image can be provided through the display module 123. Herein, the display module 123 is a module configured to output an image, and if implemented as a touch-type module, it may receive a user input. Herein, stereoscopic image contents provided by the program (or application) may be previously stored in the user device 120 or received from a content providing server (not illustrated). That is, the content providing server includes multiple glass-free stereoscopic image contents and a user can access the content providing server through the program (or application) and check and play a glass-free stereoscopic image content.

Meanwhile, the camera 122 may be built in the user device 120 or may be implemented as a separate external camera which can be detachably mounted on the user device 120. For example, if the user device 120 is a smart phone or a tablet PC, the camera 120 may be implemented as a built-in camera.

The glass-free stereoscopic image display device 100 in accordance with an embodiment of the present disclosure is lenticular lenses 210-type device, and the lenticular lenses 210 is located within the cover 110.

Hereinafter, a structure of the cover 110 will be described in detail with reference to FIG. 2 through FIG. 4.

Figure 2:
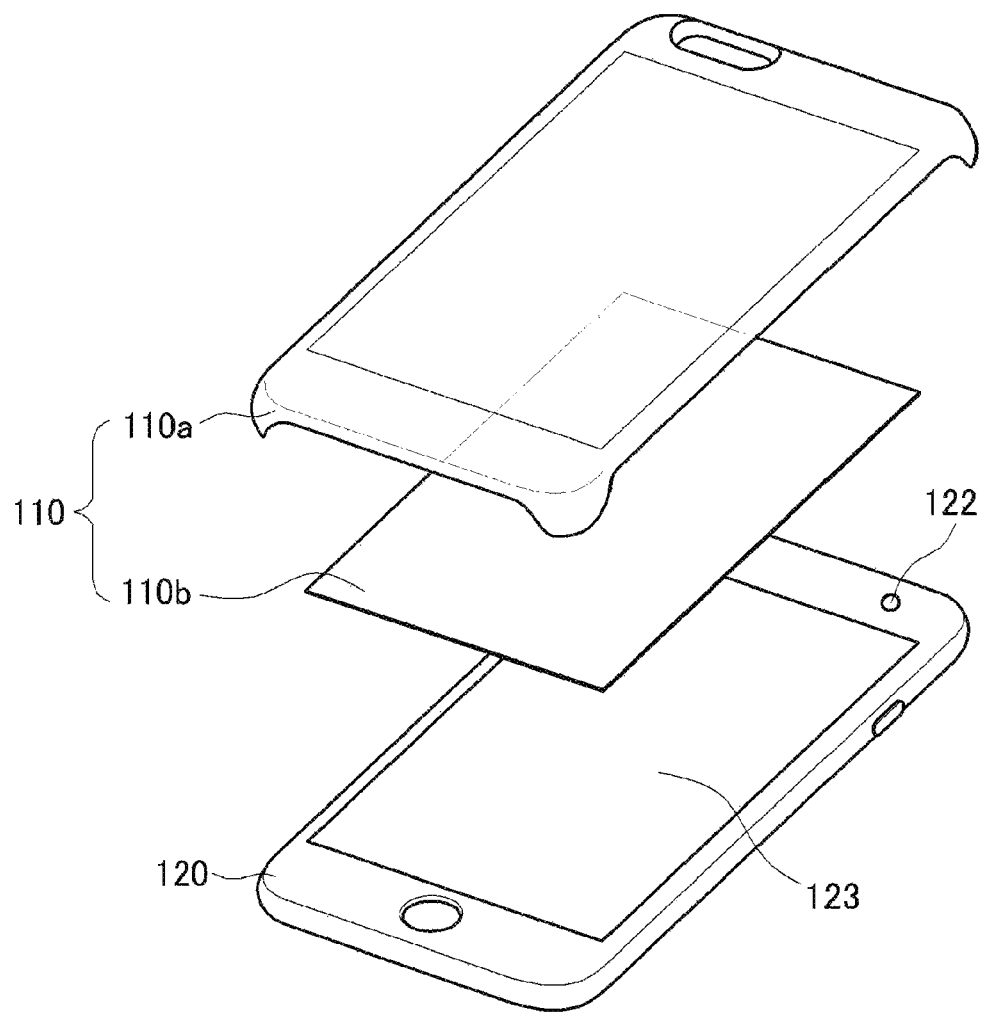
FIG. 2 is an exploded perspective view of a cover including lenticular lenses in accordance with an embodiment of the present disclosure.

Referring to FIG. 2, the cover 110 may include a main body 110*a* and a lens sheet 110*b*.

The main body 110*a* may be formed to have a size and a shape suitable to be combined with a front surface of the user device 120. For example, as shown in FIG. 2, the main body 110*a* may be formed to have downwardly protruding apexes with engagement parts and thus can be entirely fastened to the user device 120.

The lens sheet 110*b* is located under the main body 110*a* or within the main body 110*a*, and includes lenticular lenses 210.

Meanwhile, the cover 110 illustrated in FIG. 2 may be a double-face combination cover. Specifically, if the user device 110 is an iOS-based smart device, since a rear-facing camera 122 is located at an uppermost end of one side of a rear surface, the rear-facing cover 110 has an opening at the uppermost end of the one side to expose the rear-facing camera 122. In this case, even if the rear-facing cover 110 is attached to the front surface of the user device 120, the opening is located above the display area, and, thus, the rear-facing cover 110 can be used as the front-facing cover 110 as it is.

Figure 3:
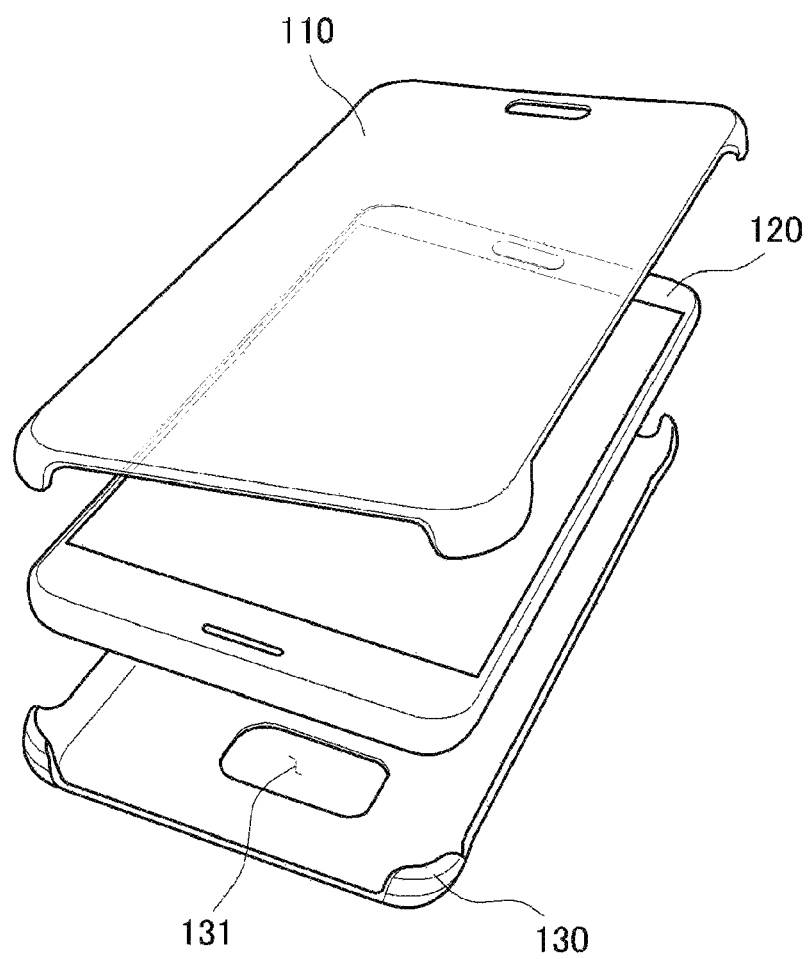
FIG. 3 is a configuration view of a cover in accordance with another embodiment of the present disclosure.

Meanwhile, the cover 110 illustrated in FIG. 3 may be a single-face combination cover 110. Specifically, if the user device 120 is a smart device in which the rear-facing camera 122 is located between an upper end and the middle of the rear surface from among android-based smart devices, the rear-facing cover 110 may have an opening 131 between the upper end and the middle of the rear surface to expose the rear-facing camera 122. In this case, if the rear-facing cover 110 is attached to the front surface of the user device 110, the opening 131 overlaps with the display area, and, thus, the display area has a blank space where the lenticular lenses 210 cannot be arranged.

Therefore, the cover 110 may be configured as a front-face combination cover, and, thus, it is difficult to combine the cover 110 directly with the rear surface of the user device 120. Accordingly, a rear-facing auxiliary cover 130 is further provided to be combined with the rear surface of the user device 120 and the cover 110 is combined with the rear-facing auxiliary cover 130, so that a double-face combination function of the cover 110 can be achieved.

Figure 4:
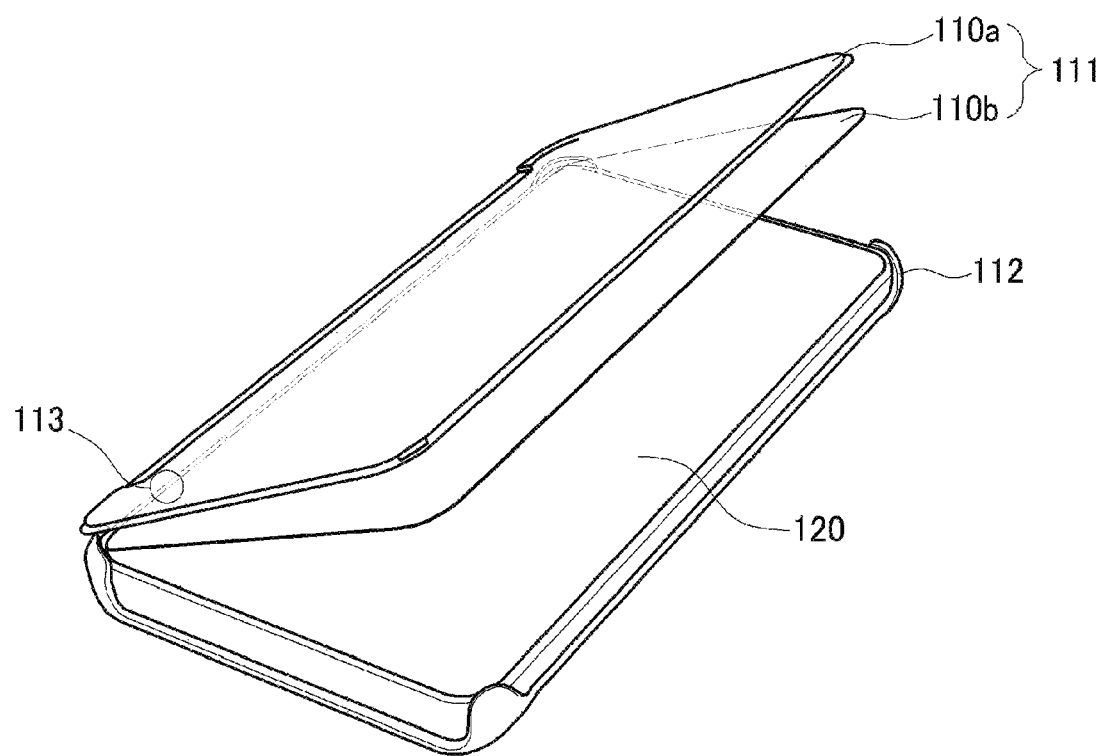
FIG. 4 is a configuration view of a cover in accordance with yet another embodiment of the present disclosure.

Meanwhile, the cover 110 may be a flip cover as illustrated in FIG. 4. The flip cover 110 is configured to be fixed on one side of the user device 120 and open and cover the front surface of the user device 120 in a hinged manner. The flip cover 110 may be divided into a cover part 111 and a case part 112. Further, the flip cover 110 may include a hall sensor 113 in one area of the cover part 111. The hall sensor 113 functions to detect whether the cover part 111 is in contact with the display area of the user device 120, transfer a result of the detection to the user device 120, and convert a 2D image played on the user device 120 into a 3D image.

Meanwhile, in order to provide an excellent stereoscopic image, a distance between the lens sheet and a screen needs to be uniform. To this end, the lenticular lenses need to be attached as closely as possible to the screen of the user device. In accordance with an additional embodiment, in the flip cover or the front-face combination cover, the main body 110*a* combined with an upper part of the user device and an auxiliary cover (not illustrated) combined with a lower part of the user device may have flat front surfaces and edges extended from the front surfaces may be curved to cover a part of lateral surfaces of the user device. In this case, curved edges (corners) of the main body 110*a* and the auxiliary cover corresponding to the lateral surfaces of the user device may be configured to be in contact with each other. Further, magnets with different polarities may be mounted on the edges of the main body 110*a* and the auxiliary cover. Meanwhile, instead of the magnets, hooks may be installed on the edges of the main body 110*a* and the auxiliary cover.

Hereinafter, an operation principle of the glass-free stereoscopic image display device in accordance with an embodiment of the present disclosure will be described in detail with reference to FIG. 5.

Figure 5:
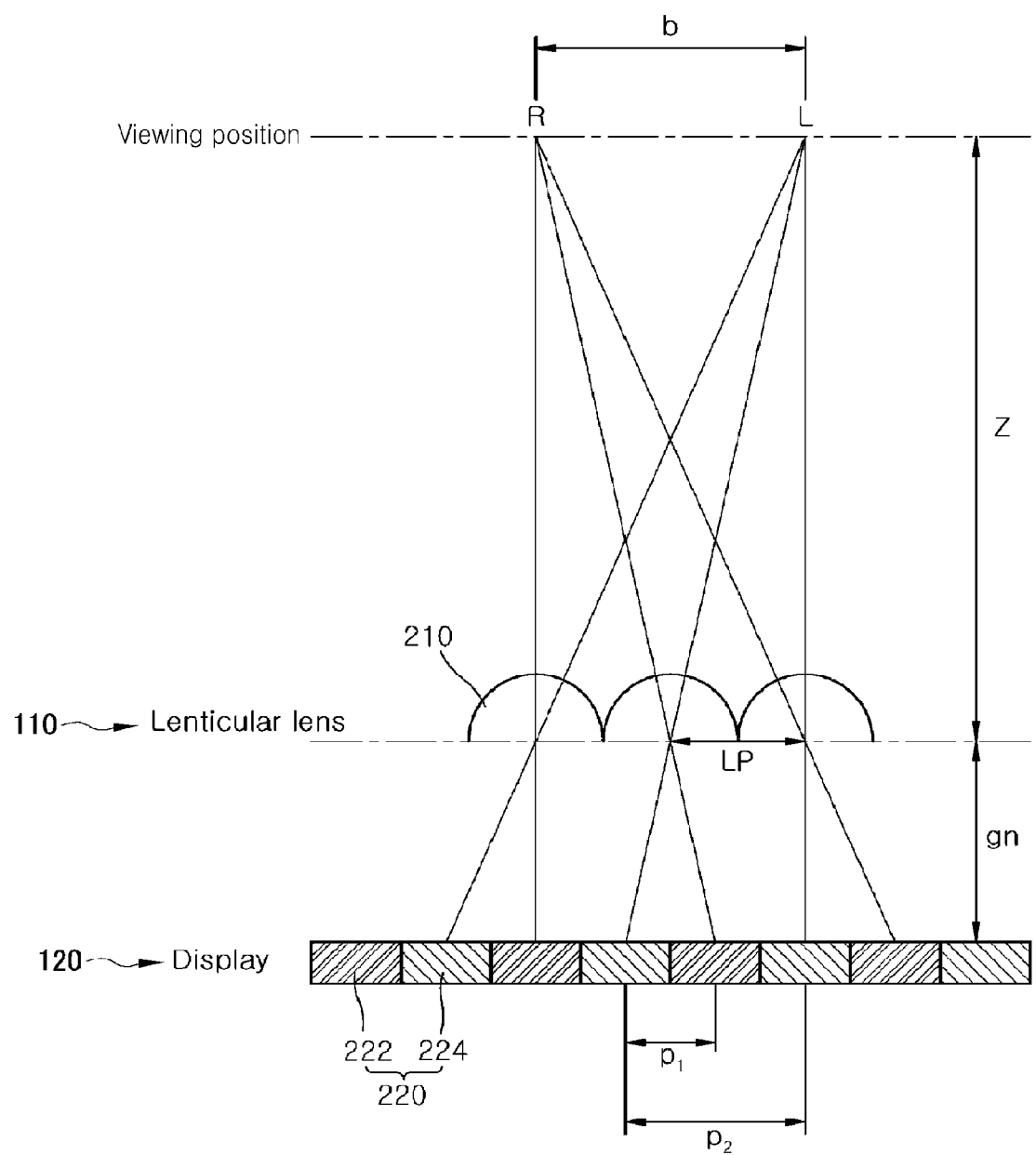
FIG. 5 is a conceptual diagram provided to explain the principle of implementing stereoscopic image display in accordance with an embodiment of the present disclosure.

In FIG. 5, a viewing position refers to a position where the right eye and the left eye of the user are placed, the lenticular lenses 210 refer to the lens sheet 110*b* of the cover 110, and the display refers to the display module 123 of the user device 120. The lens sheet 110*b* has a structure in which multiple lenticular lenses 210 are arranged side by side, and the display module 123 includes pixels 220, i.e., multiple first and second mapping patterns 222 and 224, for implementing colors corresponding to a stereoscopic image. The first and second mapping patterns 222 and 224 are arranged alternately and configured to be provided to the respective eyes of the user.

A stereoscopic image may be provided to the user by separately defining the first mapping pattern provided to the right eye of the user and the second mapping pattern provided to the left eye of the user and projecting the first and second mapping patterns onto the respective eyes through the lens sheet 110*b*.

In this case, in order to view a more vivid glass-free stereoscopic image through the user device 120 and the lens sheet 110*b* placed on the screen of the user device 120, it is necessary to adjust a position of the lenticular lenses 210 and a position of the first and second mapping patterns 222 and 224.

For example, a pixel (i.e., second mapping pattern 224) for a left eye L may be present at a position for a right eye R or may deviate from a desired position. In order for the second mapping pattern 224 to be placed at the position for the left eye L, a method of moving the multiple lenticular lenses 210 may be considered. However, the lens sheet 110*b* is already fixed at one position. Thus, it is difficult to implement such a method. This means that a lens pitch LP' indicating a distance between the centers of the adjacent convex lenses 210 included in the lens sheet 110*b* has a fixed value.

Therefore, in accordance with an embodiment of the present disclosure, even when the multiple lenticular lenses 210 are fixed, an optimal stereoscopic image is provided to the user.

Firstly, the processor 121 may receive a glabella width from the user. In this case, since a glabella width varies from person to person and it is difficult for the user to numerically measure his/her glabella width, a glabella width is previously set for each face size. Thus, when the user selects a face size, a standard glabella width can be automatically input. Otherwise, the processor 121 may not receive a glabella width, but may preset a glabella width to a specific value. Alternatively, the processor 121 may take a photo of the user's face to extract the glabella width of the user in real time.

Then, the processor 121 adjusts a rendering pitch $P_2$ of the display module 123 on the basis of the glabella width b and a predetermined lens pitch LP'.

Specifically, the processor 121 may calculate a distance $P_1$ between the first and second mapping patterns 222 and 224 adjacent to each other from among the multiple first and second mapping patterns 222 and 224 (i.e., left-eye pixel pattern and right-eye pixel pattern) and the rendering pitch $P_2$ indicating a distance between the multiple second mapping patterns 224 on the basis of the lens pitch LP' and the glabella width b. In this case, the processor 121 may perform calculation using a triangle proportion between the calculated distance $P_1$ and rendering pitch $P_2$ illustrated in FIG. 5.

The distance $P_1$ between the first and second mapping patterns 222 and 224 and the rendering pitch $P_2$ are obtained from a proportional expression (Equation 1) among the lens pitch LP', the glabella width b, a viewing distance Z, and an optical distance gn using the triangle proportion illustrated in FIG. 2.

$$P_1 = (LP'*b)/(2b - LP')  \quad \text{[Equation 1]}$$

The rendering pitch $P_2$ is two times greater than $P_1$ and thus can be expressed by a function relative to the lens pitch LP' and the glabella width b in the same manner as $P_1$. Thus, the rendering pitch $P_2$ can be obtained.

In a state where the rendering pitch $P_2$ is adjusted, the processor 121 may calculate an optimal viewing distance Z indicating a distance at which the user can view the most vivid stereoscopic image through the user device 120, on the basis of the glabella width b, the lens pitch LP', and the optical distance gn indicating a distance between the lenticular lenses 210 and the display module 123 of the user device 120. Herein, the optical distance gn may be a value calculated (fixed) in consideration of a refractive index and a physical distance from the lenticular lenses 210 and the display module 123.

The glabella width b, the lens pitch LP', and the optical distance gn are already determined values. Thus, according to Equation 1, the first viewing distance Z can be expressed as Equation 2.

$$Z(2b*gn)/LP' - gn \quad \text{[Equation 2]}$$

Meanwhile, it is possible to view a glass-free stereoscopic image only when the above-described cover 110 is attached to the display area of the user device 120. Otherwise, it is possible to view a glass-free stereoscopic image only when the lenticular lenses are solely and directly attached to the display area. Thus, in a factory where the cover 110 is manufactured, the cover 110 is manufactured to meet the standard of the display area and then attached to the user device 120. In this case, assuming that a designed attachment angle is a°, an error of at least 0.05° occurs even if the cover 110 is attached as precisely as possible. This angle error may make it difficult to view a vivid stereoscopic image. Further, an additional angle error may occur when the user detaches and attaches the cover 110. According to an embodiment of the present disclosure in order to solve this problem, the pixels constituting the display module 123 are controlled to have an alignment angle on the screen according to an alignment state of the attached lenticular lenses 110b, and, thus, an error can be minimized.

The meanings of the pixel line P and the lens line L will be defined first.

Figure 6:
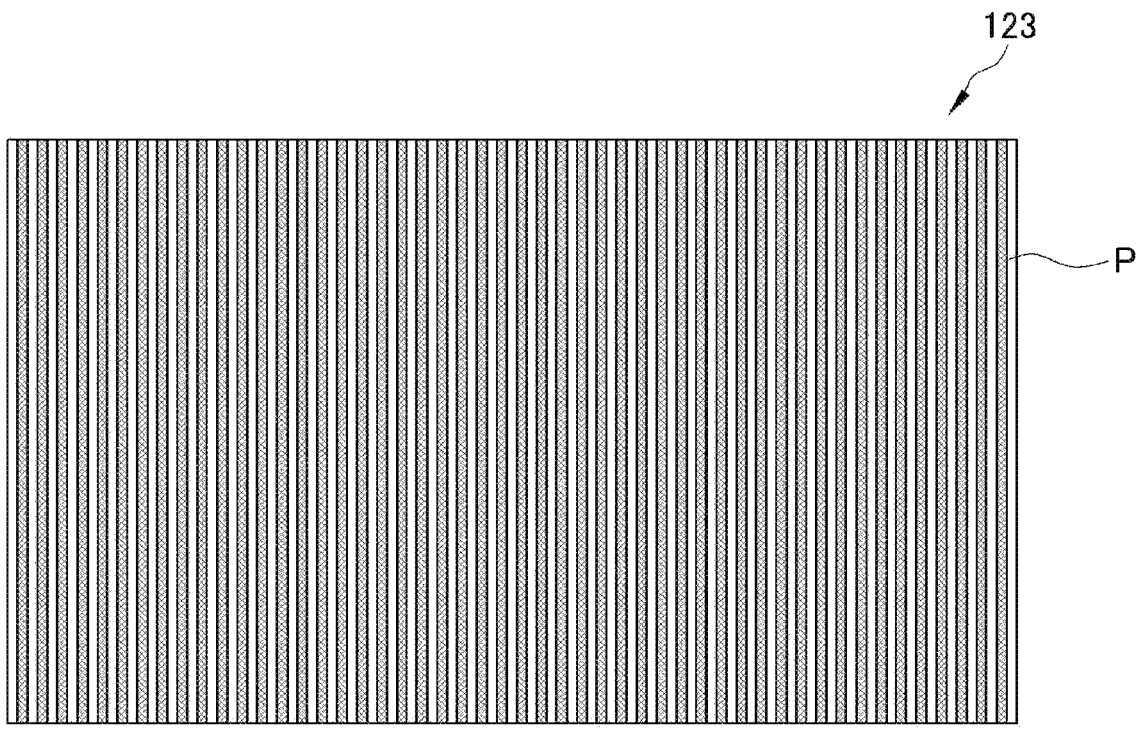
FIG. 6 is a conceptual diagram provided to explain a pixel line of a glass-free stereoscopic image providing device (user device)

The display module 123 is composed of a set of multiple pixels, and color or on/off of each pixel can be controlled independently. By controlling colors or on/off of the pixels, multiple lines can be displayed in the display area. In this case, on/off patterns of the pixels can be mapping patterns (i.e., the above-described first and second mapping patterns) of the pixels for providing a glass-free 3D image. For example, if pixels equally spaced vertically and linearly among all the pixels are turned off, lines as shown in FIG. 6 can be displayed. That is, the pixel line P is represented by an array pattern of pixels and refers to multiple lines with a specific slant and represented through the multiple pixels constituting the display area. FIG. 6 illustrates the pixel line P with a vertical slant, but the present disclosure is not necessarily limited thereto. That is, if pixels to be turned on/off are arranged differently, the pixel line P may not have a vertical slant. Desirably, the pixel line P slanted in the acute angle range may be provided. This is because if the pixel line P has a vertical slant, moire is highly likely to occur. Such controlling of colors or on/off of pixels may be performed by software installed in the processor of the user device.

Figure 7B:
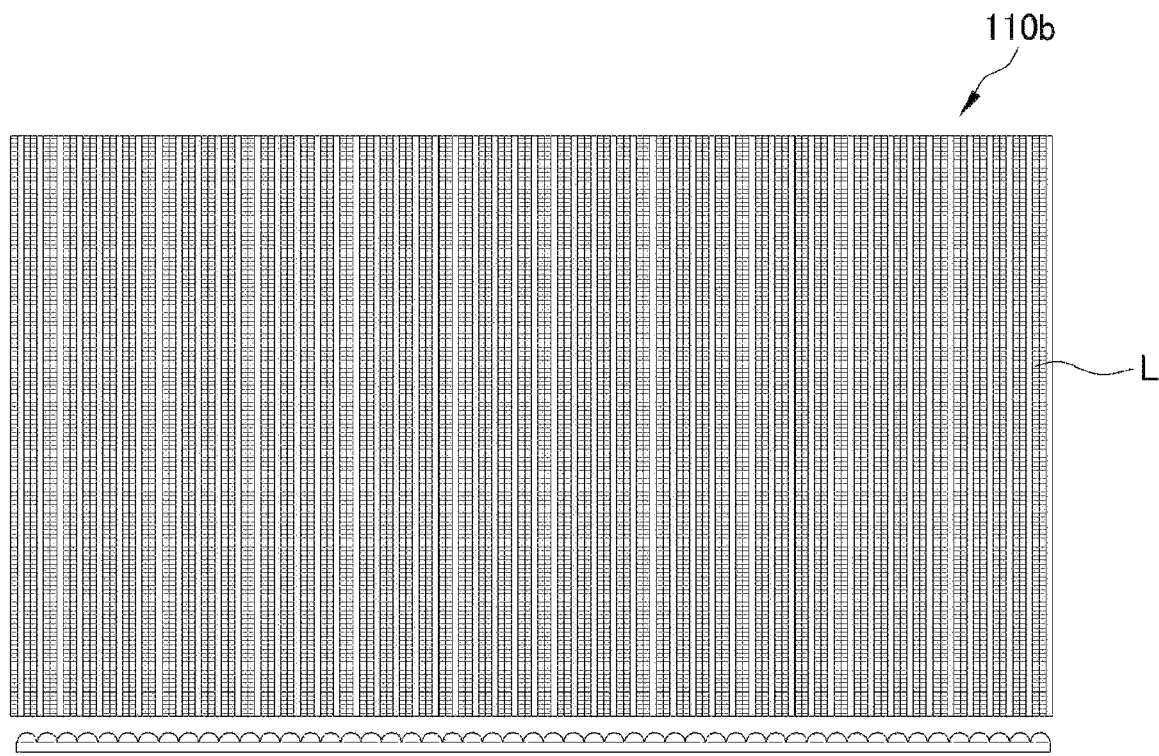

Referring to the bottom of FIG. 7A, a cross-sectional view of the lenticular lenses 110b included in the cover 110 is shown. The lenticular lenses 110b are configured of multiple convex lenses each extended in one direction and having a semicircular cross section. Such a convex lens can be displayed by magnifying a point A under the convex lens. That is, an image which can be seen by a viewer above the convex lens is limited to a portion corresponding to an area under the convex lens, and this can be simply illustrated as shown at the top of FIG. 7 in which a narrow slit is between convex lenses. Therefore, the lenticular lenses 110b can be illustrated as an array of vertical lines in FIG. 7B. That is, the lens line L refers to a pattern of multiple lines formed by the multiple convex lenses constituting the lenticular lenses 110b.

Figure 8A:
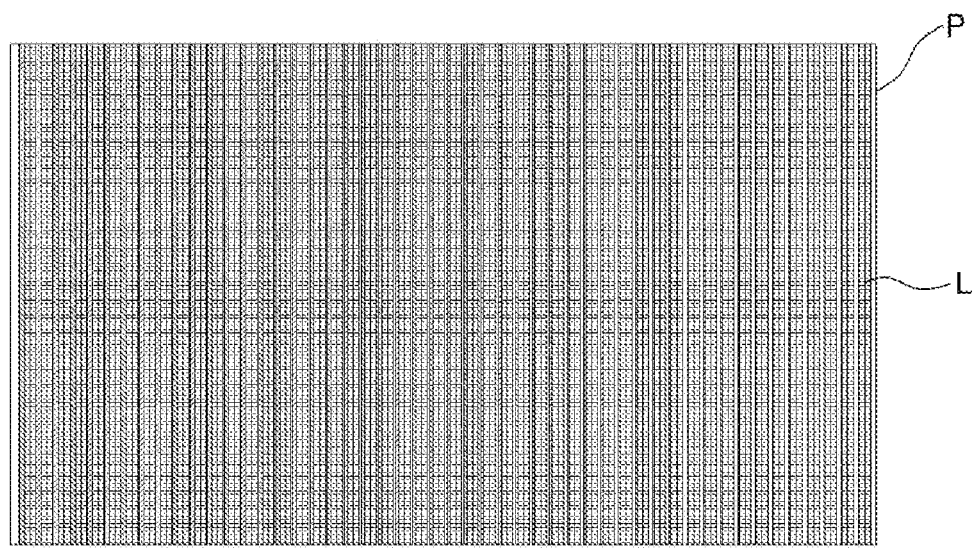
FIG. 8A is a conceptual diagram illustrating an interference pattern line shown when a pixel line and a lens line are exactly matched with each other.

FIG. 8A illustrates a case where the pixel line P and the lens line L have the same angle. That is, it can be seen that if the pixel line P and the lens line L have the same angle, interference pattern lines formed by the pixel line P and the lens line L also have the same vertical angle.

Figure 10A:
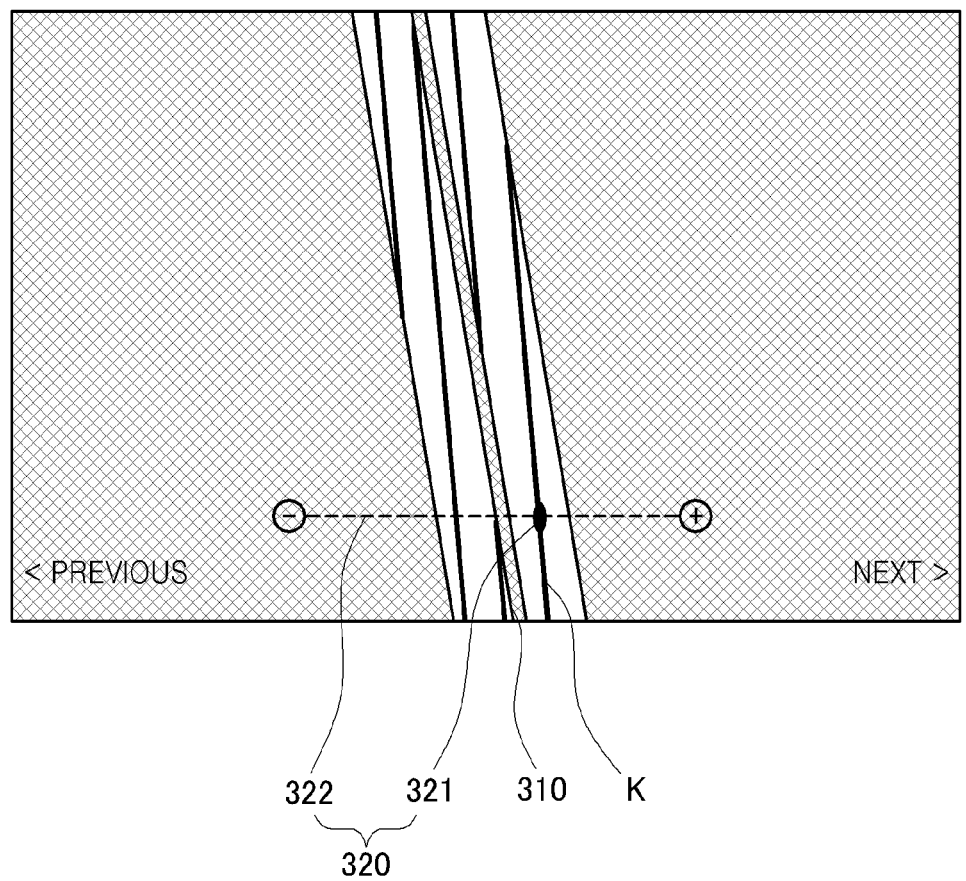
FIG. 10A and FIG. 10B are diagrams illustrating an example of an angle adjustable user interface in accordance with an embodiment of the present disclosure.

In this case, the interference pattern lines refer to lines of interference pattern shown to the viewer when the cover 110 including the lenticular lenses and the display area of the user device 120 overlap with each other. When the cover 110 and the display overlap with each other, the pixel line P and the lens line L overlap with each other, and, thus, an interference pattern is shown to the viewer. Therefore, in the case where the cover 110 is not combined with the user device 120, an interference pattern is not seen to the viewer even if the user device is provided with a user interface as shown in FIG. 10A.

Figure 8B:
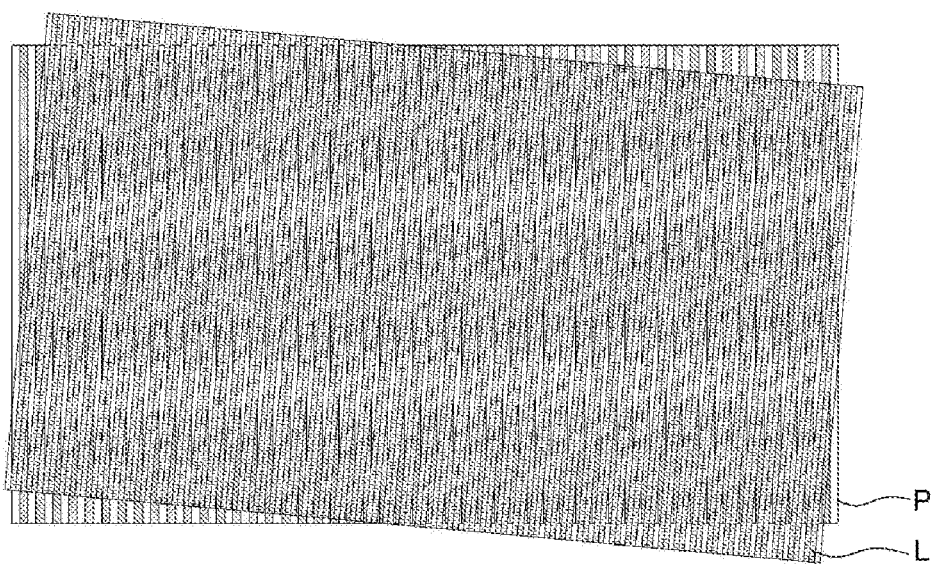
FIG. 8B is a conceptual diagram illustrating an interference pattern line shown when a pixel line and a lens line are misaligned with each other.

FIG. 8B illustrates a case where the pixel line P and the lens line L have different angles. That is, FIG. 8B illustrates an example where the cover 110 is attached to the user device 120 with a predetermined error compared to a designed value. In this case, it can be seen that interference pattern lines formed by the pixel line P and the lens line L appear in a diagonal direction differently from the pixel line P and the lens line L. That is, the interference pattern lines and the pixel line P have different angles.

That is, if the interference pattern and the pixel line P have an angle error to each other as shown in FIG. 8B, a glass-free stereoscopic image can be seen only when the angle of the pixel line P is adjusted to the angle of the lens line L.

Figure 9:
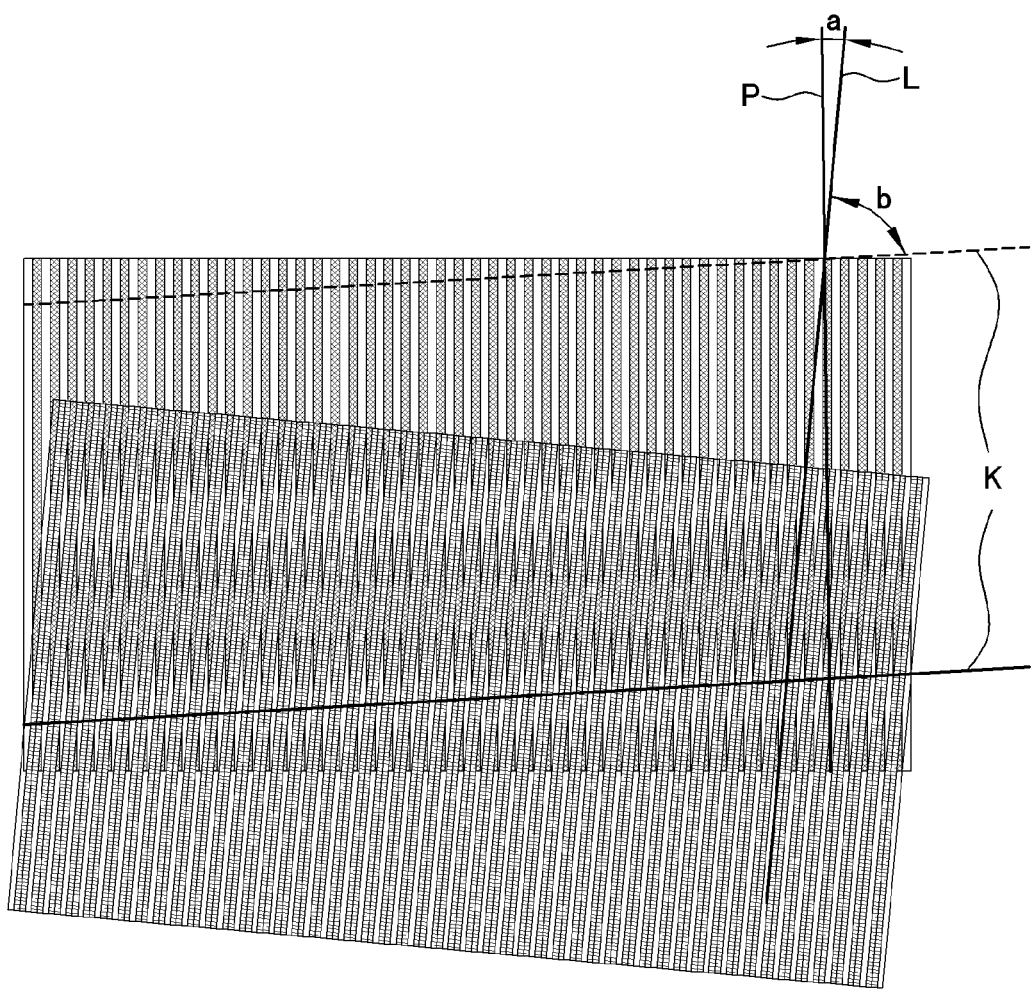
FIG. 9 is a conceptual diagram provided to show angle values calculated when a pixel line and a lens line are misaligned with each other.

Meanwhile, in FIG. 9, an angle difference value between the pixel line P and the lens line L is assumed as a° and an angle difference value between an interference pattern line K and the pixel line P is assumed as b°. In this case, a relation formula between a and b can be obtained as b=a*H (H=20 to 40, desirably 30). In other words, it can be said that an angle difference between the interference pattern line K and the pixel line P is several ten times higher than an actual alignment angle difference between the lenticular lenses 110b and the pixels. That is, actually, an angle difference between the pixel line and the lens line at which a glass-free stereoscopic image is not seen clearly has an angle value that is too small to be visible to the naked eye. When this small angle value is magnified several ten times, it can be seen equal to the angle difference between the interference pattern line K and the pixel line P. Further, as can be seen from FIG. 9, a width of the interference pattern line K is shown much greater than a width of the pixel line P or a width of the lens line L. Therefore, a difference between the interference pattern line K and the pixel line P can be shown visible to the user's eyes. Thus, when the user adjusts the angle difference between K and P, an actual alignment error between the pixel line and the lens line can be corrected.

Therefore, according to an embodiment of the present disclosure, by enabling the user him/herself to adjust an angle difference between the interference pattern line K and the pixel line P, an intuitive angle adjustable user interface can be provided to the user and the lenticular lenses 110b and the screen can be aligned very accurately.

Hereinafter, the angle adjustable user interface will be described in detail.

The memory of the user device 120 according to an embodiment of the present disclosure stores a program configured to implement a method of reducing an alignment error between the user device 120 and the lenticular lenses 110b to view a glass-free stereoscopic image, and the processor 121 may provide the angle adjustable user interface upon execution of the program stored in the memory and perform the functions thereof.

FIG. 10A illustrates an example of the angle adjustable user interface.

The angle adjustable user interface shows at least one interference pattern line K and at least one reference line 310. The reference line 310 and the interference pattern line K are displayed distinguishably to the user in terms of at least one of contrast, saturation, color, width, and length and may be displayed as overlapping with each other.

The interference pattern line K is formed by the pixel line P and the lens line L and thus composed of multiple lines. In this case, the multiple interference pattern lines K may have a pattern in which lines of two contrast colors (e.g., black and white) appear alternately. The angle adjustable user interface may display at least one of these interference pattern lines K. Referring to FIG. 10A, three interference pattern lines K are illustrated, and the other interference pattern lines K are provided hidden by processing the other area to be invisible. If too many interference pattern lines K are provided to the user, the user may have trouble adjusting the interference pattern lines K. Therefore, only a predetermined number of interference pattern lines K may be displayed. However, the present disclosure is not limited thereto. The interference pattern lines K may be displayed in the entire area of the screen or may be displayed in a wider or narrower area than the area as illustrated in FIG. 10A.

The reference line 310 provides a reference angle value to which the user needs to adjust an angle of the interference pattern line K. The reference line 310 may be set at a certain angle. Otherwise, an angle of the reference line 310 may be set on the basis of a designed value of the lens line L of the lenticular lenses. Specifically, the designed value may refer to a desired slant value of the lens line when the lenticular lenses are combined with the screen, and the angle of the reference line may be set to a slant value desired when the lenticular lenses are manufactured. Meanwhile, the reference line 310 is illustrated as the length connecting the top and the bottom of the display area, but is not limited thereto. The reference line 310 may be represented as another length.

However, desirably, the reference line 310 may be set to continuously have the same angle as the pixel line P. In this case, the user can correct an alignment error more easily and accurately.

Further, the angle adjustable user interface includes an angle adjustment unit 320 configured to receive a user input to adjust a slant angle of at least one interference pattern line K.

The angle adjustment unit 320 includes a control button 321 that moves in response to a user input and a control button movement line that defines a movable path for the control button 321. In this case, a rotation direction of the pixel line P is determined from one of a clockwise direction and a counterclockwise direction depending on a movement direction of the control button 321. Further, a rotation angle of the pixel line P is determined depending on a movement distance of the control button 321. The interference pattern line K is naturally formed when the pixel line P overlaps with the lens line L. Therefore, if a slant of the pixel line P is adjusted by controlling the control button 321, a rotation direction or a rotation range of the interference pattern line K can also be adjusted.

In the above-described examples, if the reference line 310 is set to continuously have the same angle as the pixel line P, when the control button 321 moves in response to a user input, the reference line 310 may also be rotated. However, as described above, a rotation angle of the interference pattern line K is about 30 times higher than a rotation angle of the pixel line P. Therefore, a rotation range of the pixel line P (i.e., the reference line 310) is about 1/30 of a rotation range of the interference pattern line K, and, thus, the user can easily adjust the interference pattern line K to the reference line 310.

FIG. 10A illustrates the movement line for the control button 321 as a bar-type line, but the present disclosure is not necessarily limited thereto. The movement line for the control button 321 may be expressed as various types such as a circular dial-type line.

Further, the angle adjustable user interface includes instructions to request for adjustment of at least one interference pattern line K to the reference line 310. According to the instructions, the user can identify which input needs to be performed at a given stage and perform an operation corresponding thereto.

Hereinafter, a process of displaying at least one interference pattern line K of the angle adjustable user interface by the processor 121 of the user device 120 will be described in detail.

The following process is performed on the premise that the cover 110 is attached to the display area of the user device 120 and the processor 121 is aware of position values for the user's two pupils. In this case, the position values for the pupils may be input by the user through a pupil-position inputting process before an angle setting process, or may be extracted by the processor 121 by directly recognizing the positions of user's pupils without the above-described process, or may be previously stored in the memory. When the pupil positions are recognized, a user interface is provided, and the user interface provides the user's face on the screen of the user device 120, provides a guideline to the user to fit the user's face on the screen within a specific area and marks dots of a specific color at the pupil positions in the face on the screen to recognize the user's pupil positions.

Figure 11A:
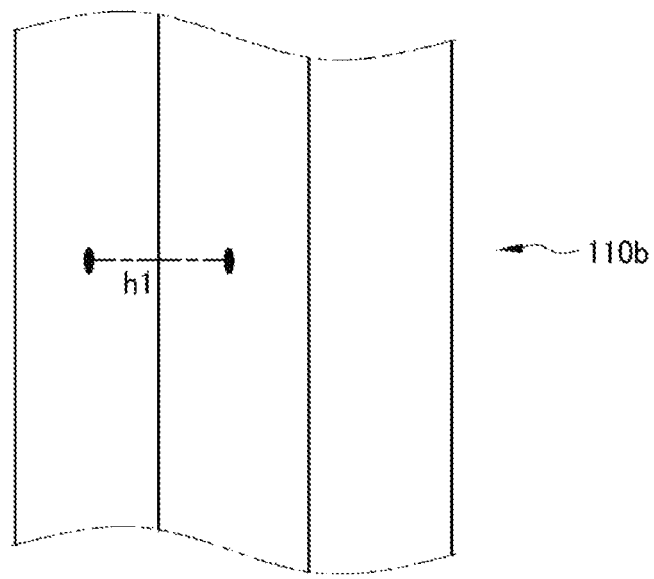
FIG. 11A and FIG. 11B are conceptual diagrams provided to show that a lens pitch is changed depending on the attached state of lenticular lenses.
Figure 11B:
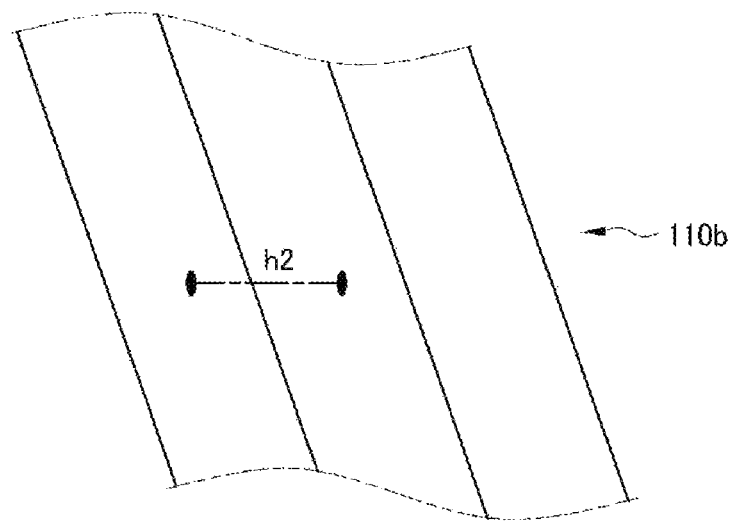

Referring to FIG. 11A, if the lenticular lenses 110b are attached accurately without an error, a lens pitch has a value of h1. Meanwhile, if the lenticular lenses 110b are attached slantly at an error angle as shown in FIG. 11B, a lens pitch has a value of h2. In this case, h1 and h2 are different from each other. That is, when the lens is attached with a predetermined error, a lens pitch is changed. Therefore, a rendering pitch for h1 and a rendering pitch for h2 become different from each other. The rendering pitch for h2 may cause a change in a distance between multiple interference pattern lines or a width of an interference pattern line depending on the size of h2. That is, only one interference pattern line may appear on one screen or dozens of interference pattern lines may appear densely on one screen. In order for the user to appropriately recognize interference pattern lines with the naked eye, a distance between interference pattern lines needs to be appropriately defined. Therefore, an initial rendering pitch is previously set before the angle adjustable user interface is provided. However, it is difficult to clearly recognize interference pattern lines at the initial rendering pitch (corresponding to the rendering pitch for h1), and, thus, an appropriate error value is applied to the initial rendering pitch to form a changed rendering pitch (corresponding to the rendering pitch for h2).

The processor 121 calculates an initial rendering pitch on the basis of the positions of pupils and a lens pitch.

Then, the processor 121 modifies the initial rendering pitch to calculate a changed rendering pitch. The changed rendering pitch may have an error of −10% to 10% of the initial rendering pitch (for example, the changed rendering pitch may be 90% to 99% or 101% to 110% of the initial rendering pitch.) Desirably, the changed rendering pitch may have an error of −5% to 10% of the initial rendering pitch.

Then, the pixel line P is formed on the basis of the changed rendering pitch.

In this case, the pixel line P may be formed as slanted in the acute angle range, but is not necessarily limited thereto. When the pixel line P is formed, the interference pattern line K naturally appears on the screen due to overlap with the lenticular lenses. The interference pattern line K is surely formed by combination between the pixel line P and the lens line L, and, thus, if an area of the screen is not covered by the lenticular lenses, the area does not show an interference pattern and may be displayed in a certain color (for example, gray).

Then, the reference line 310 having the same angle as the pixel line P is displayed.

Then, the processor 121 may receive the user's input to adjust a slant angle of the interference pattern line K to the reference line 310. The user may adjust the slant angle of the interference pattern line K by moving the control button 321 of the angle adjustment unit 320.

Figure 10B:
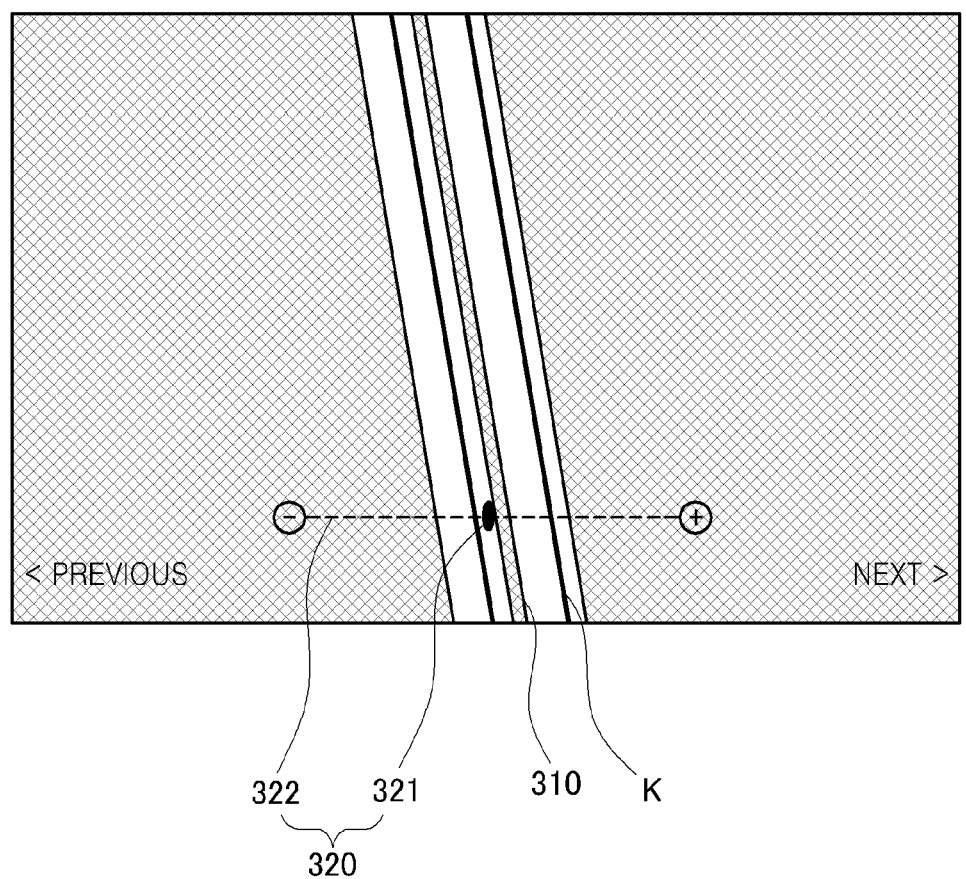

In this case, the processor 121 rotates the pixel line P according to a movement direction and a movement distance of the control button 321 as shown in FIG. 10B, and the interference pattern line K is naturally displayed to the user's eyes as being rotated.

The user may arrange the interference pattern line K at a position most closely matched to the reference line 310 with the naked eye and then perform an input operation for "next stage" and thus can complete the angle adjustment process.

In this case, the processor 121 may regard the input operation for "next stage" as an input to complete the angle adjustment and define a slant angle of the pixel line P on the basis of an angle value of the interference pattern line K in a final state. Thus, the processor 121 can complete correction of an alignment error between the user device and the lenticular lenses.

After the conditions to view a glass-free stereoscopic image are completely set, if the processor receives a command to play a stereoscopic image selected by the user, a pixel data structure for providing a glass-free stereoscopic image is constructed on the basis of the pixel line P with the defined slant angle (i.e., first and second mapping patterns for providing a glass-free 3D image are defined on the basis of the defined slant angle, i.e., a pixel data structure in which pixel on/off areas are defined on the basis of the defined slant angle and RGB values are determined in a pixel on area.

Therefore, a very vivid glass-free stereoscopic image can be provided.

Figure 12:
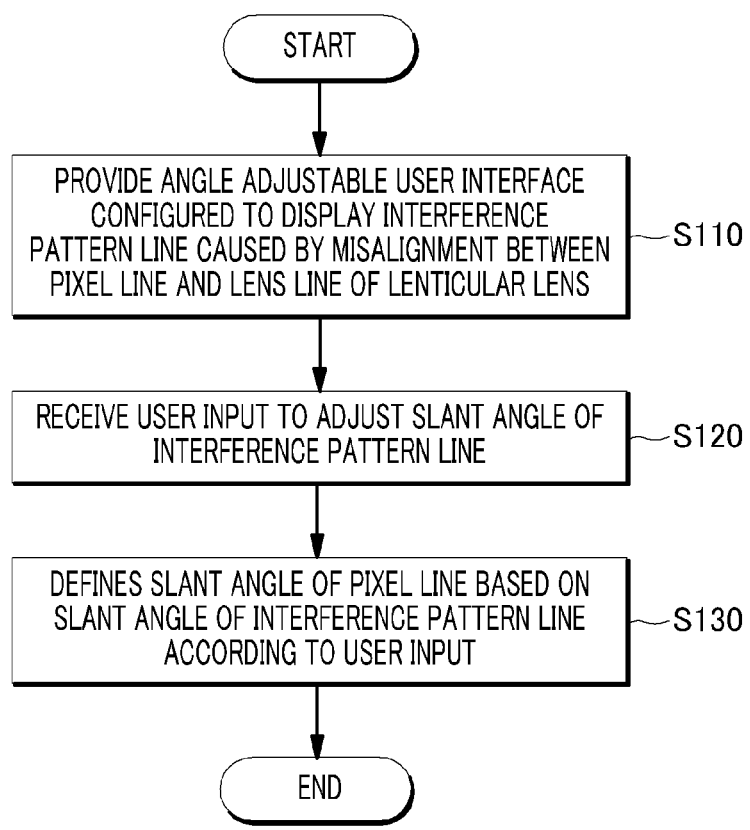
FIG. 12 is a flowchart provided to explain a method of reducing an alignment error between a user device and lenticular lenses to view a glass-free stereoscopic image in accordance with an embodiment of the present disclosure.

Hereinafter, a method of reducing an alignment error between the user device 120 and the lenticular lenses 110b to view a glass-free stereoscopic image according to an embodiment of the present disclosure will be described in detail with reference to FIG. 12. The following method is performed by the processor 121 of the user device 120 described above. Therefore, any omitted parts will be substituted with the above descriptions.

The processor 121 provides the angle adjustable user interface that displays the interference pattern line K caused by misalignment between the pixel line P and the lens line L of the lenticular lenses 110b (S110).

The angle adjustable user interface includes the angle adjustment unit 320, and the user can change a slant angle of the interference pattern line K by controlling the angle adjustment unit 320.

The processor 121 receives a user input to adjust a slant angle of the interference pattern line K (S120). In this case, the user can adjust the slant angle of the interference pattern line K to the reference line 310.

The processor 121 defines a slant angle of the pixel line P on the basis of the slant angle of the interference pattern line K according to the user input (S130). The angle of the interference pattern line K is 30 times magnified from the angle of the actual pixel line P, and, thus, it is possible to find a misalignment angle error with very high accuracy.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Glass-free stereoscopic image display device 110: Cover
120: User device 123: Display module

I claim:

1. A method of reducing an alignment error between a user device and lenticular lenses to view a glass-free stereoscopic image, comprising:
   (a) providing an angle adjustable user interface configured to display at least one line and a reference line in a display area of the user device where the lenticular lenses attach;
   (b) receiving a user input to adjust a slant angle of the at least one line to the reference line; and
   (c) displaying the at least one line with a changed slant angle in response to the user input and defining an array pattern of multiple pixels constituting the display area according to at least one changed line,
   wherein the at least one line appears due to overlap between multiple convex lenses constituting the lenticular lenses and the multiple pixels having a specific array pattern, and
   wherein the at least one line has a pattern in which lines of two contrast colors appear alternately.

2. The method of reducing an alignment error between a user device and lenticular lenses to view a glass-free stereoscopic image of claim 1,
   wherein the reference line and the at least one line are displayed to be distinguished by a user in terms of at least one of contrast, saturation, color, width, and length.

3. The method of reducing an alignment error between a user device and lenticular lenses to view a glass-free stereoscopic image of claim 1,
   wherein the process (a) includes:
   (a-1) calculating a changed rendering pitch by modifying an initial rendering pitch that indicates a distance between left-eye pixel patterns or a distance between right-eye pixel patterns and forming the array pattern of the multiple pixels on the basis of the changed rendering pitch, and
   a width of multiple lines displayed on the display area and a distance between the multiple lines are determined by the changed rendering pitch.

4. The method of reducing an alignment error between a user device and lenticular lenses to view a glass-free stereoscopic image of claim 3,
   wherein the initial rendering pitch is set depending on position values for the user's pupils before the process (a).

5. The method of reducing an alignment error between a user device and lenticular lenses to view a glass-free stereoscopic image of claim 4,
   wherein the changed rendering pitch is calculated as a value having an error of −5% to 5% of the initial rendering pitch.

6. The method of reducing an alignment error between a user device and lenticular lenses to view a glass-free stereoscopic image of claim 1,
   wherein the at least one line is an interference pattern line formed by a lens line and a pixel line,
   the pixel line is composed of multiple lines represented through the array pattern of the multiple pixels constituting the display area of the user device and has a specific slant, and
   the lens line represents a pattern of multiple lines formed by the multiple convex lenses constituting the lenticular lenses.

7. The method of reducing an alignment error between a user device and lenticular lenses to view a glass-free stereoscopic image of claim 6,
   wherein a width of the interference pattern line has a value magnified predetermined times compared with a width of the pixel line,
   a slant difference between the interference pattern line and the pixel line has a value magnified predetermined times compared with a slant difference between the pixel line and the lens line.

8. The method of reducing an alignment error between a user device and lenticular lenses to view a glass-free stereoscopic image of claim 6,
   wherein the process (c) includes:
   changing the slant angle of the pixel line to change a slant angle of the interference pattern line and displaying the interference pattern with the changed slant angle in response to the user input.

9. The method of reducing an alignment error between a user device and lenticular lenses to view a glass-free stereoscopic image of claim 6,
   wherein a slant angle of the reference line is set to a certain angle or set on the basis of a designed value of the lens line of the lenticular lenses.

10. The method of reducing an alignment error between a user device and lenticular lenses to view a glass-free stereoscopic image of claim 8,
    wherein a slant angle of the reference line is set to be identical to the slant angle of the pixel line.

11. The method of reducing an alignment error between a user device and lenticular lenses to view a glass-free stereoscopic image of claim 10,
    wherein a slant difference between the interference pattern line and the pixel line has a value magnified predetermined times compared with a slant difference between the pixel line and the lens line, and a range in which the slant angle of the reference line is changed is narrower than a range in which the slant angle of the interference pattern line is changed in response to the user input.

12. The method of reducing an alignment error between a user device and lenticular lenses to view a glass-free stereoscopic image of claim 8,
    wherein the angle adjustable user interface further includes:
    an angle adjustment unit configured to receive a user input to adjust the slant angle of the pixel line and thus to change the slant angle of the interference pattern.

13. The method of reducing an alignment error between a user device and lenticular lenses to view a glass-free stereoscopic image of claim 12,
    wherein the angle adjustment unit includes a control button that moves in response to a user input and a control button movement line that defines a movable path for the control button, and
    the at least one interference pattern line is slanted at a predetermined angle in a clockwise direction or a counterclockwise direction depending on a movement direction and a movement distance of the control button.

14. The method of reducing an alignment error between a user device and lenticular lenses to view a glass-free stereoscopic image of claim 1,
wherein the angle adjustable user interface further includes:
instructions to request for adjustment of the at least one line to the reference line.

15. The method of reducing an alignment error between a user device and lenticular lenses to view a glass-free stereoscopic image of claim 6,
wherein the process (c) includes:
defining a slant angle of the pixel line corresponding to a final angle of the interference pattern line if a user input corresponding to completion of angle adjustment is received, to complete correction of an alignment error between the user device and the lenticular lenses.

16. The method of reducing an alignment error between a user device and lenticular lenses to view a glass-free stereoscopic image of claim 15, further comprising:
(d) constructing a pixel data structure configured to provide a glass-free stereoscopic image on the basis of the pixel line with the defined slant angle if a command to play a stereoscopic image is received.

17. A user device configured to reduce an alignment error between the user device and lenticular lenses to view a glass-free stereoscopic image, comprising:
a memory that stores a program configured to implement a method of reducing an alignment error between a user device and lenticular lenses to view a glass-free stereoscopic image; and
a processor configured to execute the program,
wherein upon execution of the program, the processor provides an angle adjustable user interface configured to display at least one line and a reference line in a display area of the user device where the lenticular lenses attach,
receives a user input to adjust a slant angle of the at least one line to the reference line, and
displays the at least one line with a changed slant angle in response to the user input and defines an array pattern of multiple pixels constituting the display area according to the slant angle of at least one changed line, and
the at least one line appears due to overlap between multiple convex lenses constituting the lenticular lenses and the multiple pixels having a specific array pattern,
wherein the at least one line has a pattern in which lines of two contrast colors appear alternately.

18. A non-transitory computer-readable storage medium that stores a program configured to implement a method of reducing an alignment error between a device and lenticular lenses to view a glass-free stereoscopic image according to claim 1.

19. A method of reducing an alignment error between a user device and lenticular lenses to view a glass-free stereoscopic image, comprising:
(a) providing an angle adjustable user interface configured to display at least one line and a reference line in a display area of the user device where the lenticular lenses attach;
(b) receiving a user input to adjust a slant angle of the at least one line to the reference line; and
(c) displaying the at least one line with a changed slant angle in response to the user input and defining an array pattern of multiple pixels constituting the display area according to at least one changed line,
wherein the at least one line appears due to overlap between multiple convex lenses constituting the lenticular lenses and the multiple pixels having a specific array pattern, and
wherein the process (a) includes:
(a-1) calculating a changed rendering pitch by modifying an initial rendering pitch that indicates a distance between left-eye pixel patterns or a distance between right-eye pixel patterns and forming the array pattern of the multiple pixels on the basis of the changed rendering pitch, and
a width of multiple lines displayed on the display area and a distance between the multiple lines are determined by the changed rendering pitch.

* * * * *